Dec. 28, 1965   R. C. CAMPBELL   3,226,551
CURRENT SHAPING CIRCUIT FOR PHOTOSENSITIVE DEVICE
Filed Aug. 17, 1962   2 Sheets-Sheet 1

REX C. CAMPBELL
    INVENTOR.

BY James J. Williams

HIS ATTORNEY

REX C. CAMPBELL
*INVENTOR.*

BY James J. Williams

HIS ATTORNEY

United States Patent Office 3,226,551
Patented Dec. 28, 1965

3,226,551
CURRENT SHAPING CIRCUIT FOR
PHOTOSENSITIVE DEVICE
Rex. C. Campbell, Waynesboro, Va., assignor to General
Electric Company, a corporation of New York
Filed Aug. 17, 1962, Ser. No. 217,598
3 Claims. (Cl. 250—206)

The invention relates to a current shaping circuit, and particularly to a current shaping circuit for shaping nonlinearly or linearly varying current.

In some electrical circuits, a required circuit, or component, or element may have a characteristic such that it permits or causes a current which varies nonlinearly. Or the circuit, or component, or element may have a characteristic such that it permits or causes a current which varies linearly. Or, the circuit, or component, or element may have a characteristic such that it permits or causes a current which varies in a relatively nonlinear manner and which also varies in a relatively linear manner. While such a circuit, or component, or element may be required for some reason, such characteristics as just mentioned may have to be changed or shaped.

Therefore an object of the invention is to provide an improved current shaping circuit for use with an electrical circuit, or component, or element.

Another object of the invention is to provide a current shaping circuit for use with an electrical circuit, or component, or element and for providing a desired variation of the current which results from the use of such an electrical circuit, or component, or element.

One component or element which results in or which causes a nonlinearly varying current is a photoconductive cell. A photoconductive cell presents a conductance which varies from a minimum value in darkness to a maximum value in bright light. The conductance variation from the minimum value to the maximum value is not linear with respect to equal and increasing amounts of light. Rather, for certain photoconductive cells, the conductance begins to increase at a relatively sharp rate for equal and increased amounts of light. With further such increased amounts of light, the conductance increases at lower rates, and finally the increase of conductance is negligible. If the conductance relative to light received is plotted, an approximate transition may be noticed between the initial sharp rate of increasing conductance and the later or final relatively linear rate of increasing conductance. The decreasing rate of change of the conductance may make such a photoconductive cell undesirable where a circuit application requires or needs a characteristic such that the cell conductance varies in a relatively linear fashion for all amounts of light which may be received by the cell. Usually, such a photoconductive cell is connected in an electrical circuit with a voltage so that a current is varied in response to the conductance changes of the cell. If the cell conductance varies in nonlinear and linear fashion, the current will also vary in nonlinear and linear fashion.

Therefore another object of the invention is to provide an improved current shaping circuit for use with a component or element having both nonlinear and relatively linear characteristics over its operating range, the current shaping circuit providing a current that varies in accordance with the linear characteristic of the component or element over a substantial portion of the operating range of the component or element.

Another object of the invention is to provide an improved current shaping circuit for use with a photoconductive cell and for providing a current that varies in accordance with the linear characteristic of the cell over a substantial portion of the entire operating range of the cell.

Briefly, these and other objects of the invention are attained by a current shaping circuit having a first resistor which shunts or bypasses some current resulting from a characteristic of the electrical component or element. The current shaping circuit also includes a second resistor having a magnitude which permits a current that is related to a characteristic of the electrical component or element. And finally, the current shaping circuit includes a rectifier which begins to conduct when the conductance of the electrical component or element increases above a selected value. When the rectifier begins to conduct, the current shunted or bypassed by the first resistor becomes fixed, and the current carried by the second resistor becomes fixed. Thus, while the electrical component or element is operating below the selected value, the first resistor shunts current that is related to the characteristic of the electrical component or element, the rectifier is inoperative, and the second resistor permits a current that is related to the characteristic of the electrical component or element. At the selected value, the rectifier begins conducting so that the first and second resistors shunt or carry no additional respective currents. While the electrical component or element is operating above the selected value, the rectifier and second resistor permit a combined current related to the characteristic of the electrical component or element. If the combined currents in the rectifier and second resistor are utilized, they will vary in a manner similar to the characteristic of the electrical component or element.

The invention may be better understood from the following description given in connection with the accompanying drawing, and the scope of the invention will be pointed out in the claims. In the drawing:

Figure 1:
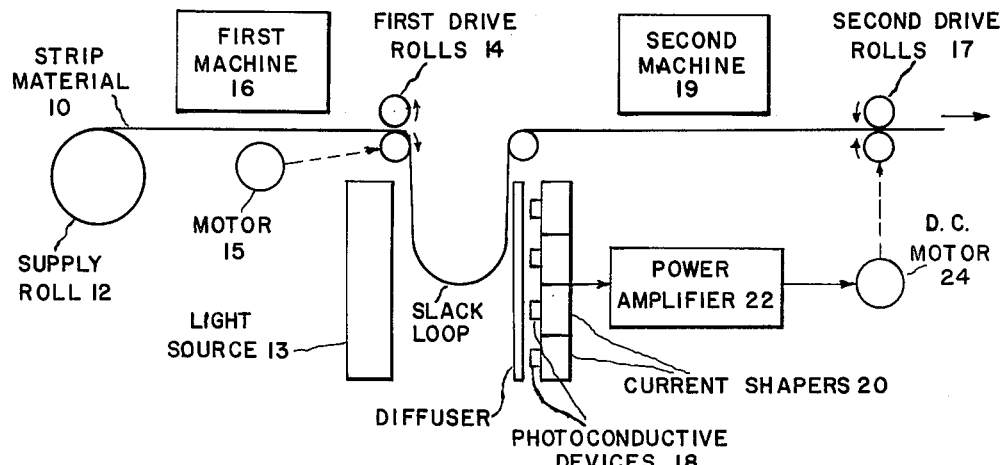
FIGURE 1 shows a block diagram of one application of the current shaping circuit of the invention.

FIGURE 1 shows a steel mill application for the current shaping circuit of the invention. In the application of FIGURE 1, strip material 10 is supplied in long lengths on a supply roll 12 and pulled by first drive rolls 14 past a first machine 16 which operates on the strip material 10. The strip material is then pulled by second drive rolls 17, past a second machine 19 which also operates on the strip material 10. The drive rolls 14, 17 are driven by separate and respective motors 15, 18. In order that the strip material 10 is pulled at substantially the same speed by the drive rolls 14, 17, a slack loop is provided between the drive rolls 14, 17. This slack loop provides a place where excess strip material 10 can be stored or where needed strip material 10 can be derived. In order to maintain the slack loop in the strip material 10 within limits and thus maintain the speed of the strip material 10 within limits, a servosystem is provided for controlling the speed of the drive rolls 14, 17 in response to the size of the slack loop. This servosystem includes a light source 13 positioned on one side of the slack loop, and a plurality of photoconductive devices 18 positioned on the other side of the slack loop. The outputs from each of the photoconductive devices 18 are applied to a current shaper 20, to be described. The outputs of the current shapers 20 are combined and applied to a power amplifier 22. The power amplifier 22 amplifies the signal provided to it and converts such a signal, if necessary, to a suitable form for application to the motor 24 which may be a direct current motor. The motor 24 drives or turns the drive rolls 17 at a speed indicative of the combined signal provided by the current shapers 20. Each of the current shapers 20 provides a signal having a magnitude or characteristic indicative of the amount of light received by the photoconductive devices 18 from the light source 16. This light is preferably diffused. The amount of this light so received depends upon the condition of the slack loop. If the slack loop is in the position indicated, the photoconductive devices 18 receive an average amount of light. Thus, an average or mean signal is provided by the current shapers 20 to drive the motor 24 at an average or mean speed. If the slack loop is shortened, the photoconductive devices 18 are illuminated more and a signal is provided to reduce the speed of the motor 24. However, if the slack loop is lengthened, the photoconductive devices 18 are illuminated less and a signal is provided to increase the speed of the motor 24. The combined total illumination on all photoconductive devices 18 varies approximately linearly as the loop depth changes. Thus, the servosystem tends to maintain the slack loop with a predetermined length for any given strip material 10 speed.

Figure 2:
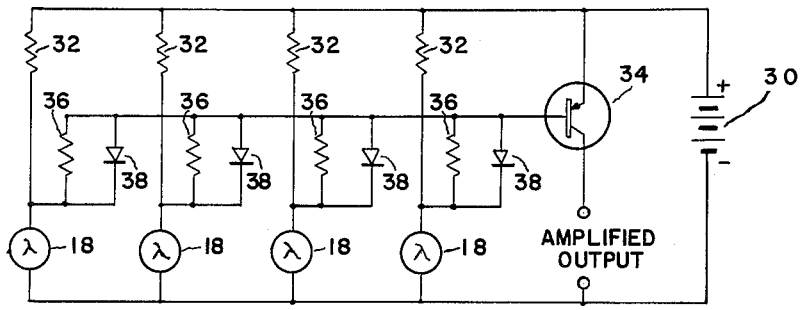
FIGURE 2 shows a schematic diagram of a plurality of current shaping circuits in accordance with one embodiment of the invention as they might be utilized in the application of FIGURE 1.

A schematic diagram of four current shapers in accordance with one embodiment of the invention is shown in FIGURE 2. These current shapers may be used as indicated in FIGURE 1. The four photoconductive devices 18 are indicated in FIGURE 2 by a circle containing the symbol λ. As is known, such a photoconductive device 18 has a conductance which increases with the amount of light received by the photoconductive device 18. In darkness, the photoconductive device 18 has a minimum conductance. As the amount of light received by the photoconductive devices 18 increases, the conductance varies in a nonlinear and/or linear manner toward a maximum value. A suitable source of unidirectional potential 30 and an amplifier, such as a PNP transistor 34, are provided for the current shapers. The amplifier output circuit may be coupled to the power amplifier 22 of FIGURE 1. Each of the current shapers includes a first resistor 32 connected in series with a photoconductive device 18. The junction of each of the first resistors 32 and the photoconductive devices 18 is coupled to the input or base electrode of the transistor 34 through a respective parallel circuit including a second resistor 36 and a rectifier device or diode 38. As one or more of the photoconductive devices 18 receives light, the photoconductive devices permit base current to flow through the transistor 34. This base current is amplified and provided to the output.

Figure 3:
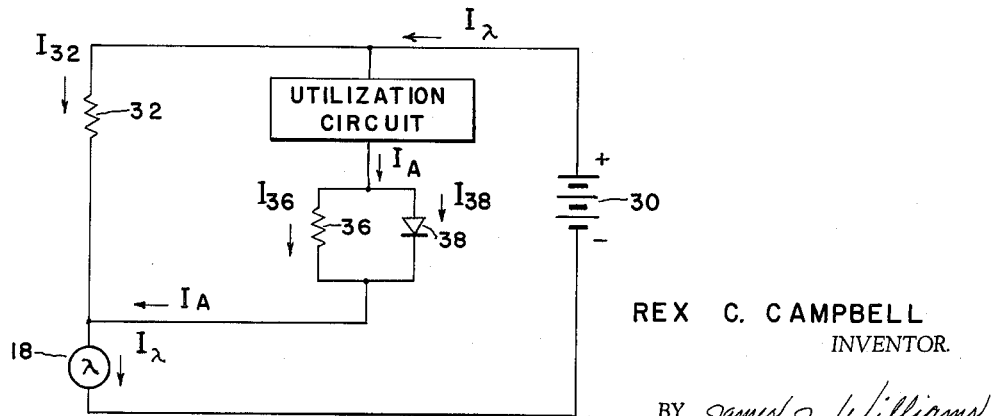
FIGURE 3 shows the basic current shaping circuit for explaining the operation of the invention.

The basic current shaper is shown in FIGURE 3 along with a photoconductive device 18 which is to have its current shaped to vary linearly with illumination. Since, in FIGURE 2, the current from each photoconductive device 18 is to be made linear, the combined current $I_A$ from all current shapers will also vary linearly as the combined illumination on all photoconductive devices 18 varies. The current supplied from the source of potential 30 in response to light on the photoconductive device 18 over an operating range is indicated by $I_\lambda$. This current $I_\lambda$ flows from the positive terminal of the source of potential 30 and divides into two currents, a current $I_{32}$ through the first resistor 32 and a current $I_A$ through the utilization circuit. In FIGURE 2, this would be the emitter-base circuit of the transistor 34. This current $I_A$ further divides into two currents, a current $I_{36}$ through the second resistor 36 and a current $I_{38}$ through the rectifier 38. In FIGURE 3, it will be seen that the following equations may be written:

$$I_\lambda = I_{32} + I_A \quad (1)$$

$$I_A = I_{36} + I_{38} \quad (2)$$

If Equation 2 is substituted in Equation 1, the following equation is obtained:

$$I_\lambda = I_{32} + I_{36} + I_{38} \quad (3)$$

Figure 4:
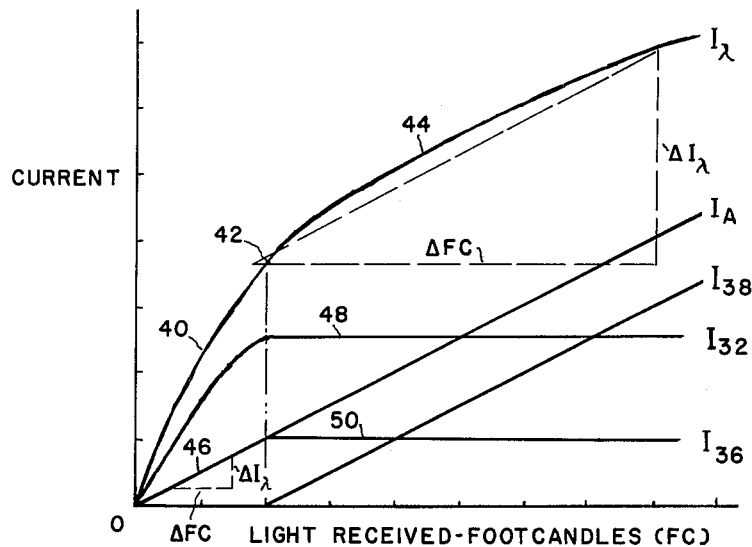
FIGURE 4 shows curves for explaining the operation of the invention.

FIGURE 4 shows curves of the various currents in the circuit of FIGURE 3 plotted with respect to the amount of light received in footcandles (FC) by the photoconductive device 18. The characteristic of a typical photoconductive device 18 is indicated by the current curve labeled $I_\lambda$. This curve indicates that it permits current to increase at a relatively sharp rate in the portion 40. The rate of current increase then tapers off at a value 42. Above the value 42, the current has a substantially linear increase in the portion 44. Since, for the purposes of the servo control shown in FIGURE 1 or for other reasons, it is desirable to have a current which varies in a substantially linear manner for all amounts of light received, the curve $I_\lambda$ may not be satisfactory. This undesirable effect is reduced by the current $I_{32}$ through the first resistor 32. In other words, the resistor 32 permits some current $I_{32}$ of the current $I_\lambda$ to be shunted or bypassed until the value 42 is reached. After this, the current $I_{32}$ is held fixed as indicated. The current $I_{36}$ increases linearly in a manner related to or with the same slope as the linear portion 44 of the curve $I_\lambda$. This linear portion 44 has a slope $$\frac{\Delta I_\lambda}{\Delta FC}$$

as indicated by the dashed lines in FIGURE 4. The current $I_{36}$ increases by the same proportion or slope $$\frac{\Delta I_\lambda}{\Delta FC}$$

This is indicated by the dashed lines along the portion 46 of the curve $I_{36}$. Accordingly, the magnitudes of the first resistor 32 and the second resistor 36 are selected so that at the point where the rectifier 38 begins conducting, and if the negligible voltage drop across the utilization circuit is neglected, the following relations are provided:

$$I_{36} = \frac{\Delta I_\lambda}{\Delta FC} \cdot FC \text{ at selected value 42} \quad (4)$$

$$I_{36} \cdot R_{36} = \text{breakdown voltage of rectifier 38} \quad (5)$$

$$I_{32} \cdot R_{32} = \text{breakdown voltage of rectifier 38} \quad (6)$$

By these equations, appropriate values of the current shaper elements can be found. When sufficient light is received by the photoconductive device 18 to cause breakdown of the rectifier 38 (this occurring at the number of footcandles at which the selected value 42 occurs), the rectifier 38 begins to conduct current as indicated by the curve $I_{38}$. Also at this time, the current $I_{32}$ in the first resistor 32 levels off, and the current $I_{36}$ in the second resistor 36 also levels off, this being indicated by the horizontal portions 48, 50 of these curves $I_{32}$ and $I_{36}$. Any increase in the current $I_\lambda$ is passed through the rectifier 38 as current $I_{38}$. Thus, it will be seen that below the selected value 42, the current $I_A$ is provided by the current $I_{36}$ through the resistor 36, and excess current is shunted or bypassed as a current $I_{32}$ through the resistor 32. When the rectifier 38 begins conducting, the currents $I_{32}$ and $I_{36}$ through the resistors 32 and 36 respectively level off and remain constant. At this point, the current $I_A$ through the utilization circuit is provided by the combined currents $I_{36}$ in the second resistor 36 and the current $I_{38}$ through the rectifier 38. In FIGURE 4, it will be seen that this current $I_A$ varies in a linear manner related to or with the same slope as the linear portion 44 of the curve $I_\lambda$ of the photoconductive device 18 over the operating range of the photoconductive device 18. Thus, the current shaping circuit of the invention provides a substantially linear current over the operating range of the photoconductive device 18 despite a relatively nonlinear characteristic and a relatively linear characteristic.

Figure 5:
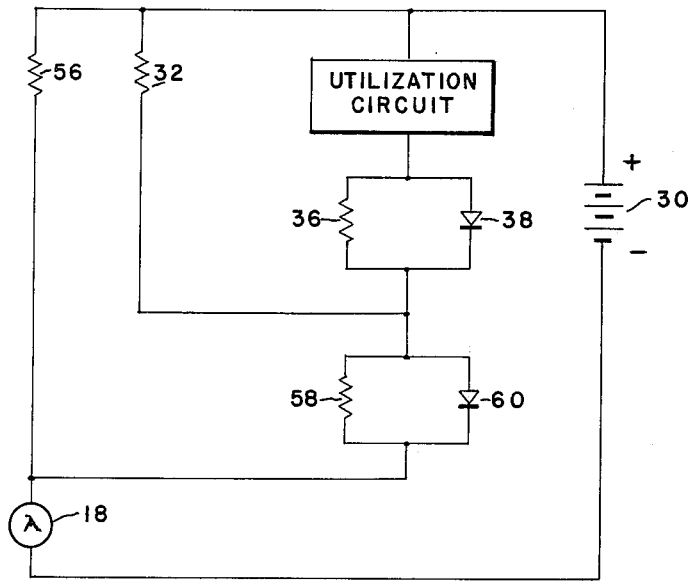
FIGURE 5 shows an electrical circuit of another embodiment of the invention.

Although the arrangement shown in FIGURE 2 and FIGURE 3 provides a desired operation for this application, it may be desirable to provide additional or more accurate shaping. This may be accomplished by a circuit such as shown in FIGURE 5. The circuit of FIGURE 5 may be used with any number of photoconductive cells 18 just as the circuit of FIGURE 3. This circuit of FIGURE 5 includes the elements of FIGURE 3 and a resistor 56 comparable to the first resistor 32, a resistor 58 comparable to the second resistor 36, and a rectifier 60 comparable to the rectifier 38. This additional current shaping circuit provides shaping at a different selected value. The values of the resistors 56, 58 are selected in a manner similar to the selection of the resistors 32, 36. Additional current shaping circuits may be provided, the number of such additional circuits being whatever is required to provide the precision or form of current shaping desired.

The basic circuit of FIGURE 3 may be used for various combinations of current shaping. By proper selection of the first resistor 32 and the second resistor 36, the utilized current $I_A$ may be shaped so that the slope has either a peak upward or a peak downward. For example, using Equation 4, if current $I_{36}$ were to be larger, while the selected value 42 were maintained, the second resistor 36 would be larger per Equation 5. The first resistor 32 would be smaller per Equations 3 and 6, resulting in a utilized current $I_A$ that has a peak upward at the illumination corresponding to the selected value 42 of $I_\lambda$. By a combination of one or more basic circuits in configurations such as shown in FIGURE 5, the utilized current $I_A$ may be made to have one or more peaks downward, one or more peaks upward, or various combinations so as to shape the current into complex forms.

It will thus be seen that the invention provides a new and improved current shaping circuit for obtaining simple or complex modification of currents from electrical circuits or components or elements which have various characteristics. Although a preferred embodiment of the invention has been shown and described, it is to be understood that modifications may be made without departing from the spirit of the invention or from the scope of the claims.

What I claim as new and desire to secure by Letters Patent of the United States is:

1. A current shaping circuit for modifying the linear or nonlinear current of an electrical device, comprising a first resistor coupled with said electrical device in a first series circuit, a second resistor and a rectifier in parallel combination, and a utilization circuit in series connection with said parallel combination and said electrical device to form a second series circuit.

2. A current shaping circuit for modifying the linear or nonlinear current of an electrical device, comprising a power source for maintaining said linear or nonlinear current, a first resistor coupled with said electrical device and said power source to form a first series circuit, a second resistor and a rectifier in parallel combination, and a utilization circuit in series connection with said parallel combination, said power source and said electrical device to form a second series circuit.

3. A current shaping circuit as defined in claim 2 wherein said electrical device is a photosensitive device.

References Cited by the Examiner

UNITED STATES PATENTS

| | | | |
|---|---|---|---|
| 2,125,273 | 8/1938 | Farrand | 250—206 |
| 2,182,322 | 12/1939 | Roberts | 250—206 X |
| 2,420,058 | 5/1947 | Sweet | 250—214 |
| 2,612,630 | 9/1952 | Greenleaf | 328—143 |
| 2,692,333 | 10/1954 | Holmes | 328—143 |
| 2,892,025 | 6/1959 | Luther et al. | 328—143 |
| 2,916,631 | 12/1959 | Hoffman | 250—214 |
| 2,927,214 | 3/1960 | Hoffman | 250—214 |
| 3,021,451 | 2/1962 | Lundahl | 250—206 X |
| 3,037,144 | 5/1962 | LaMantia | 250—206 X |
| 3,097,309 | 7/1963 | Pearlman | 328—143 |
| 3,109,103 | 10/1963 | Wilhelmsen | 328—145 |

RALPH G. NILSON, *Primary Examiner.*

ARCHIE R. BORCHELT, *Examiner.*